# 2,821,519

STABILIZATION OF POLYMERIC N-VINYL PYRROLIDONES WITH HYDRAZINO COMPOUNDS

Samuel A. Glickman, Easton, Pa., assignor to General Aniline & Film Corporation, New York, N. Y., a corporation of Delaware No Drawing. Application December 30, 1955
Serial No. 556,413

12 Claims. (Cl. 260—45.5)

This invention relates to a process of stabilizing polymeric N-vinyl pyrrolidones with hydrazine and hydrazine derivatives against discoloration.

Polymeric N-vinyl pyrrolidones are colorless horn- or glass-like materials with a high softening point which are usually employed in solution form as textile assistants, finishing, thickening, sticking, binding or pharmaceutical agents. Among its many applications, the polymers are finding use as additives in a host of cosmetic and pharmaceutical products and as the water soluble component associated with the preparation of "grafted polymers." These "grafted polymers" are obtained by the polymerization of a monomeric substance in the presence of a water-soluble polyvinyl pyrrolidone to give yarns and fibers of good color stability and enhanced dye receptivity.

It has been the objective of the prior art workers in the polymerization of vinyl pyrrolidone, as disclosed in United States Patent 2,634,259, to secure polymers whose aqueous solutions are colorless. In accordance with the disclosure of said patent, a sample of 25% aqueous vinyl pyrrolidone, buffered with 1.5% disodium phosphate, was polymerized at the reflux point with 1% hydrogen peroxide of 30% strength. The percentages are based on monomer content. The vapors were distilled off leaving the aqueous solution of polyvinyl pyrrolidone. While the partial objective of this patent was to reach a colorless polymer solution, the resulting solution did not possess any great stability towards continual heating as might be encountered in the several commercial applications of the product. Thus, a 10% aqueous solution of polyvinyl pyrrolidone, prepared as above, of initial 99.5% transmittance at 430 m$\mu$ in a 1 cm. path, dropped to 92.5% after 144 hours at reflux.

In the course of the commercial application of polymeric N-vinyl pyrrolidones, it is frequently necessary to employ the spray dried powders. The exposure of the aqueous polymer solution to the rigors of high temperatures of the spray drying operation has frequently given rise to powders which when re-dissolved in water or organic solvents have poor color and poor color stability to heat. In other words, instead of the solution of the re-dissolved polymers being colorless, they develop an undesirable yellow color.

Polymeric N-vinyl pyrrolidones are employed in the preparation of "grafted polymers," serving as the water-soluble polymeric component which imparts dye substantivity to yarns and fibers prepared in this manner. Any yellowing associated with the preparation of the "grafted polymer" and the processing thereof to fibers will be detrimental to the appearance of the fiber and in addition will confer on the subsequently dyed fiber a shift in shade as well as a dull cast. Considerable literature on the subject is available and may be found in J. Polymer Science 4, 767–8; British Patent 715,194; German Patents 801,233; 801,746 and 810,812. Very frequently in the preparation, i. e. in the processing and spinning of polymeric N-vinyl pyrrolidone containing fibers, the use of high temperatures are required. Under these conditions, it is highly desirable to have the polymer capable of resisting heat treatment with maintenance of good color stability. No satisfactory method has been proposed to stabilize such polymers so that they would be capable of resisting heat treatment without development of color.

It is an object of the present invention to stabilize polymeric N-vinyl pyrrolidones and copolymers thereof against discoloration by treatment with hydrazine and hydrazine derivatives.

A further object is to stabilize polymeric N-vinyl pyrrolidones in polymerization liquor prior to spray, hot roll or drum drying, and in wet and dry spinning operations.

Other objects and advantages will become apparent from the following description:

I have found that polymeric N-vinyl pyrrolidones and copolymers thereof can be very readily stabilized towards discoloration by the addition of hydrazine or hydrazine derivatives at any time but preferably immediately following polymerization or copolymerization of N-vinyl pyrrolidones. When hydrazine is employed it may be incorporated in an amount ranging from 0.1 to 0.5% by weight of the polymer or copolymer in the polymerization liquor prior to spray drying, hot roll or drum drying, fiber preparation or any other processing involving exposure to heat or the use of heated solutions, e. g. sterilization of dilute aqueous solutions of polyvinylpyrrolidone. In lieu of hydrazine, a hydrazine derivative in equimolar amount may be added to the polymeric N-vinyl-2-pyrrolidone or copolymer thereof in solution form, and the solution subjected in a satisfactory fashion to requisite processing. Other methods of treatment of the polymer or copolymer with the hydrazine or hydrazine derivatives will become more apparent from the working examples.

Polymeric N-vinyl pyrrolidones and copolymers of N-vinyl pyrrolidones which may be stabilized in accordance with the present invention are characterized by the following general formulae:

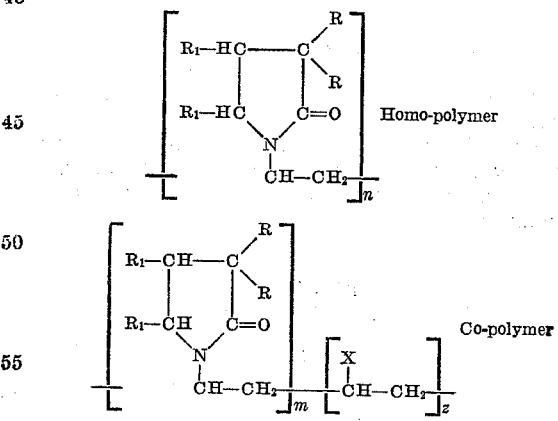

wherein R represents either hydrogen or methyl groups, and $R_1$ represents either hydrogen, methyl or ethyl groups, and $n$, $m$ and $z$ represent a number indicative of the degree of polymerization and X is halogen e. g. chlorine, carbalkoxy e. g. —$COOCH_3$, —$COOC_2H_5$ etc., cyano, acyloxy e. g. —$OCOCH_3$, —$OCOC_2H_5$ etc., aryl e. g. phenyl, alkoxy e. g. methoxy, ethoxy, butoxy, and aryloxy e. g. phenoxy.

All of the specific polymeric materials characterized by the foregoing general formulae are prepared by homo-polymerizing the following monomers:

N-vinyl-2-pyrrolidone
N-vinyl-5-methyl pyrrolidone
N-vinyl-5-ethyl pyrrolidone

N-vinyl-3,3-dimethyl pyrrolidone
N-vinyl-3-methyl pyrrolidone
N-vinyl-4-methyl pyrrolidone
N-vinyl-4-ethyl pyrrolidone The copolymers are obtained by co-polymerization of the aforementioned N-vinyl-2-pyrrolidones with monomers such as vinyl chloride, vinyl acetate, vinyl propionate, acrylonitrile, methyl acrylate, ethyl acrylate and styrene, and the like.

Depending upon the extent of polymerization, the polymeric N-vinyl pyrrolidones have molecular weights ranging from 500 to 200,000. Viscosity measurements are used as an indication of the average molecular weight of the polymers which are characterized by a chain of carbon atoms to which the lactam rings are attached through their nitrogen atoms:

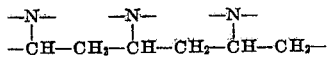

The viscosity coefficient, K, which is fully described in Modern Plastics 23, No. 3, 157–61, 212, 214, 216, 218 (1945), is calculated as follows:

$$\frac{\log \eta \text{ rel}}{C} = \frac{75K^2}{1+1.5KC} + K$$

where C is the concentration in grams per 100 cc. of polymer solution and $\eta$ rel is the ratio of the viscosity of the solution to that of pure solvent. The K values are reported as 1000 times the calculated viscosity coefficient in order to avoid the use of decimals. For the purpose of the present invention, I employ those polymers having a K value of 10 to 100, preferably of 30 to 100 because of their viscosity at lower concentrations.

The number of recurring polymer units enclosed by brackets in the foregoing general formulae, indicated by "$n$" the extent or degree of polymerization, corresponds to a chain of 192 to 980 monomer units. In actual practice, a mixture of polymer each containing a different number ($n$) of monomer units is always produced. The polymers are readily prepared by the procedural steps given in United States Patents 2,265,450, 2,318,804 and 2,335,454 and in which working examples of all the species characterized by the above formula are given and the teachings of which are incorporated herein by reference. The copolymers are prepared in the conventional manner.

The hydrazine and substituted hydrazines which may be employed as stabilizing agents in accordance with the present invention are characterized by the following general formula:

R—NHNH₂

R₁NHNHR

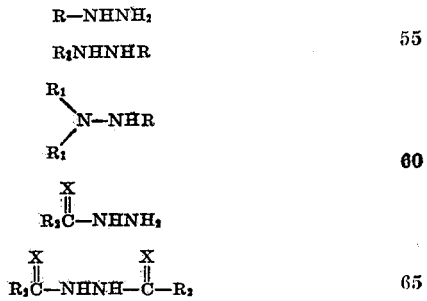

wherein R represents hydrogen, alkyl, hydroxy alkyl, e. g. hydroxy ethyl, hydroxy propyl, hydroxy butyl, or ammonium acetate, ammonium propionate, and ammonium butyrate radicals. R₁ represents either alkyl, hydroxy alkyl e. g. hydroxyethyl, hydroxypropyl, hydroxybutyl or ammonium acetate, ammonium propionate, and ammonium butyrate radicals, R₂ represents ONH₄, NH₂, or alkyl, e. g. methyl, ethyl, propyl, etc., and X represents either oxygen or sulfur.

As illustrative examples of such hydrazines and substituted hydrazines, the following may be mentioned:

H₂NNH₂
hydrazine

CH₃NHNH₂
methyl hydrazine

C₂H₅NHNH₂
ethyl hydrazine

C₃H₇NHNH₂
propyl hydrazine

C₄H₉NHNH₂
butyl hydrazine

H₂NNHCH₂COONH₄
hydrazinoacetic acid, ammonium salt

H₂NNHCH₂CH₂CH₂COONH₄
hydrazinobutyric acid, ammonium salt

H₂NNHC₂H₅OH
β-hydroxyethyl hydrazine

H₂NNHC₃H₇OH
3-hydroxypropyl hydrazine

H₂NNHC₄H₉OH
4-hydroxybutyl hydrazine

CH₃NHNH—CH₃
sym. dimethyl hydrazine

C₂H₅NHNHC₂H₅
sym. diethyl hydrazine

C₃H₇NHNHC₃H₇
sym. dipropyl hydrazine

C₄H₉NHNHC₄H₉
sym. dibutyl hydrazine

NH₄OOCCH₂NHNHCH₂COONH₄
hydrazoacetic acid, ammonium salt

NH₄OOCCH(CH₃)—NHNHCH(CH₃)—COONH₄
hydrazopropionic acid, ammonium salt (CH₃)₂NNH₂
unsym. dimethyl hydrazine (C₂H₅)₂NNH₂
unsym. diethyl hydrazine (C₃H₇)₂NNH₂
unsym. dipropyl hydrazine (C₄H₉)₂NNH₂
unsym. dibutyl hydrazine CH₃—NH—NH—CH₃
sym. dimethyl hydrazine C₂H₅NH—NHC₂H₅
sym. diethyl hydrazine $$CH_3-\overset{O}{\underset{\|}{C}}-NHNH_2$$
(acethydrazide)

$$NH_2-\overset{O}{\underset{\|}{C}}-NHNH_2$$
(semicarbazide)

NH₂NH—COONH₄
(hydrazino formic acid, ammonium salt)

$$NH_2-\overset{S}{\underset{\|}{C}}-NHNH_2$$
(thiosemicarbazide)

CH₃—CONHNH—COCH₃
(sym. diacetyl hydrazine)

NH$_4$OOCNHNHCOONH$_4$ (hydrazoformic acid, ammonium salt)

NH$_2$—CONHNH—CONH$_2$ (hydrazoformamide or hydrazidicarbamide)

The following examples will serve to illustrate how the various polymeric N-vinyl pyrrolidones and copolymers thereof may be stabilized in accordance with the present invention. It is to be understood, however, that these examples are merely illustrative and are not to be ocnsidered as being limitative of the invention disclosed and claimed.

All the parts are by weight unless otherwise noted.

*Example I*

The continued heating at reflux of 10% aqueous polymeric N-vinyl-2-pyrrolidone (referred to in the table as PVP) for a period of 144 hours gives rise to the formation of a yellow coloration. The stabilization obtained by adding hydrazine and substituted hydrazines to 10% polymer solutions prior to such heat treatment is given below. The table shows clearly the effect of the agent in preventing color formation as measured by the percent transmittance at 430 m$\mu$. A 5 cc. glass cell was employed with a light path of 1.0 cm.

| Stabilizer | Amount Based on PVP | | Percent T at 430 m$\mu$. at Various Hours | | | | |
|---|---|---|---|---|---|---|---|
| | Wt. Percent | Mole Percent | 0 hr. | 1 hr. | 24 hr. | 48 hr. | 144 hr. |
| None | | | 98.5 | 97.5 | 94.0 | 92.0 | 86.0 |
| Hydrazine | 0.10 | 0.003 | 99.0 | 99.0 | 98.0 | 96.5 | 95.0 |
| $\beta$-Hydroxyethyl Hydrazine | | 0.003 | 98.0 | 97.5 | 95.5 | 94.0 | 91.0 |
| Hydrozino diacetic acid, ammonium salt | | 0.003 | 99.0 | 97.0 | 97.0 | 94.0 | 89.5 |
| Acetyl hydrazide | | .003 | 98.0 | 97.5 | 97.0 | 96.0 | 94.0 |

*Example II*

A solution of 600 parts of 25% aqueous polymeric N-vinyl-2-pyrrolidone was polymerized according to the process described in U. S. P. 2,634,259 employing 1% H$_2$O$_2$ (30%) and 1.5% disodium hydrogen phosphate, each based on monomer. Polymerization was initiated at reflux followed by the spontaneous and promoted distillation of 100 parts of liquid in the course of one hour. The remaining 500 parts of a 30% aqueous polymeric N-vinyl-2-pyrrolidone solution was appropriately diluted to give a 10% solution of 99.5% transmittance at 430 m$\mu$. This solution was employed for the following heat stability studies.

A suitable control was heated at reflux for a 144 hour period along with samples modified with (a) 0.1 wt. percent hydrazine (.003 mole percent), (b) 0.2 wt. percent hydrazine (.006 mole percent) and (c) .006 mole percent 2-hydroxyethyl hydrazine. All percentages are based on polymer content. After 24 hours the untreated sample was visibly pale yellow whereas the modified samples were visibly colorless. After 144 hours the percent transmittance of the control was 92.5% at 430 m$\mu$ and was noticeably yellow. The 0.1 wt. percent and 0.2 wt. percent hydrazine modified samples were essentially colorless with respective percent transmittances of 97.0 and 99.0% at 430 m$\mu$. The .006 mole percent 2-hydroxyethyl hydrazine modified sample was very faintly colored at a percent transmittance of 95.5 at 430 m$\mu$.

The foregoing example indicates the beneficial effect of adding small amounts of stabilizer to a disodium phosphate buffered polymerizate solution to give an improvement over the constituted prior art.

*Example III*

A solution of 250 parts of 40% aqueous polymeric N-vinyl-2-pyrrolidone was polymerized according to the process described in PB25652 employing 1% hydrogen peroxide (30%) and 0.09% ammonia (100%), each based on monomer. In the first half-hour of the polymerization the temperature rose from 50° C. to 90° C. During the following half-hour at 90° C. the monomer content reached the vicinity of 1%. A portion of the visibly colorless solution was treated with acetyl hydrazide to contain 0.25 wt. percent based on polymer. The untreated control and the modified sample were heated at 95° C. for three additional hours. At the end of this time, the acetyl hydrazide containing sample had undergone no visible change in color and had a 96% transmittance at 430 m$\mu$. The control sample had developed a noticeably yellow coloration with a measured percent transmittance of 85% at 430 m$\mu$. The above spectrophotometric measurements were performed in a 5 cc. glass cell with a 1 cm. light path against distilled water as a standard.

The above example illustrates the color stabilizing effect of 0.25% acetyl hydrazide when added to a 40% aqueous polymerizate at a point very close to complete polymerization followed by a 3 hour heating period required for complete utilization of the monomer.

*Example IV*

A sample of 30% aqueous polymeric N-vinyl-2-pyrrolidone containing 0.2 wt. percent sym. dimethylhydrazine based on polymer, and a suitable material for control were spray dried at 130–140° C. (stock temperatures) to give the respective dry powders. Each of the resulting powders were re-dissolved to give 10% aqueous solutions and subjected to 144 hours heating at reflux. The sample of initial hydrazine modification before spray drying underwent a drop in percent transmittance at 430 m$\mu$ of 10% whereas the control suffered a decrease of 38% in percent transmittance at 430 m$\mu$ and was highly orange colored.

The above example demonstrates clearly the effectiveness and retention of a high degree of stability by treated liquid polymerizates even after the rigorous treatment of spray drying at temperatures of 130–140° C.

*Example V*

For various cosmetic purposes, it is frequently necessary to steam strip aqueous polymeric N-vinyl-2-pyrrolidone to effect the removal of volatile and odorous by-products. In the course of such heat treatment, the polymer solution undergoes yellowing. Thus, a freshly prepared 40% solution of PVP (K40) was subjected to steam distillation for one hour during which time a volume was distilled equal to that of the original charge. The original percent transmittance of 97% at 430 m$\mu$ fell to a value of 88% and was colored pale yellow.

Under steam stripping conditions identical to the above, an 0.25% hydrazine treated sample underwent a change of percent transmittance from 97% at 430 m$\mu$ to a value of 93.5% and was very faintly colored.

The foregoing example clearly shows the stabilizing effect of small percentage of hydrazine on aqueous polymeric N-vinyl-2-pyrrolidone solutions exposed to steam stripping conditions.

*Example VI*

The use of 3½% aqueous polymeric N-vinyl-2-pyrrolidone in the preparation of certain pharmaceutical preparations necessitates final processing of the formulated liquid in the appropriately sealed container under conditions of steam sterilization of 240–250° F. Under this treatment, the material prepared in the conventional manner, undergoes yellowing.

The incorporation of as little as 0.01% hydrazine (based on PVP content) furnishes a degree of protection but the use of 0.1% hydrazine gives excellent stabilization. Thus, sterilization at 240–250° F. for 1 hour of 3½% aqueous polymeric N-vinyl pyrrolidone solutions of original percent transmittance at 430 mµ of 99% gives a yellow-tinted solution of 95% transmittance. The use of .01 and 0.1% hydrazine gives respectively solutions of 96 and 98% transmittance at 430 mµ.

The above demonstrates the effectiveness of hydrazine in preventing development of color in steam sterilized 3½% aqueous polymeric N-vinyl pyrrolidone.

Copolymers of N-vinyl pyrrolidones with other polymerizable monomers are also discolored on heating of solutions or on standing. The addition of hydrazine or hydrazine derivatives to vinyl pyrrolidone copolymer in bulk or solution is also beneficial. Vinyl compounds copolymerizable with vinyl pyrrolidone include vinyl ethers, acrylic nitriles, vinyl halides e. g. vinyl chloride, vinyl esters e. g. vinyl acetate, alkyl acrylates and the like.

*Example VII*

A co-polymer of acrylonitrile and N-vinyl-2-pyrrolidone was prepared according to Example I of U. S. P. 2,713,573. The thoroughly washed and dried polymer was incorporated to an extent of 7% in a medium consisting of 45% zinc chloride, 15% magnesium chloride, 39.95% water and .05% hydrazine. The above mixture was stirred and subjected to heating at 90° C. for several hours to aid in solution of the polymer. The solution, which was colorless, was forced through spinnerets into a coagulating bath at 15° C. Colorless filaments were thereby produced.

In a control experiment, where hydrazine was omitted, the spinning solution had acquired a yellow-orange coloration by the time solution of the polymer had taken place. The filaments produced by forcing the solution through spinnerets into a coagulating bath were cream to yellow colored.

*Example VIII*

A grafted polymer was prepared from acrylonitrile and polymeric N-vinyl-2-pyrrolidone, according to the procedure of Example 17 of British Patent 715,194. The product was dissolved in dimethyl formamide, containing 0.1% by weight 2-hydroxyethylhydrazine, to give a 15% solution by heating to 125° C. with stirring. The solution, which was virtually colorless, was spun according to the procedure of Example 18 of the aforesaid patent to yield colorless filaments.

The corresponding filaments produced by the procedure of Example 18 of the aforesaid patent were cream to yellow colored as contrasted to the colorless filaments obtained in the analogous procedure wherein 2-hydroxyethyl hydrazine was present.

*Example IX*

Example I was repeated with the exception that polymeric N-vinyl-2-pyrrolidone was replaced by an equivalent amount of polymeric N-vinyl-5-methyl pyrrolidone.

*Example X*

Example II was repeated with the exception that polymeric N-vinyl-2-pyrrolidone was replaced by an equivalent amount of polymeric N-vinyl-5-ethyl pyrrolidone.

*Example XI*

Example II was repeated with the exception that polymeric N-vinyl-2-pyrrolidone was replaced by an equivalent amount of polymeric N-vinyl-3-methyl pyrrolidone.

*Example XII*

Example II was repeated with the exception that polymeric N-vinyl-2-pyrrolidone was replaced by an equivalent amount of polymeric N-vinyl-4-methyl pyrrolidone.

The results obtained with Examples IX to XII were substantially the same as in Examples I and II.

The use of polymeric N-vinyl pyrrolidones for various cosmetic applications has placed a specification of low odor on the product. This low odor requirement has made it necessary to conduct the polymerization at high temperatures for protracted periods of time to ensure a more complete utilization of the odorous monomer. During this protracted heating time, discoloration of the polymer solution takes place. The incorporation of hydrazine or hydrazine derivative has resulted in remarkably stable solutions with hardly any development of yellow coloration.

It has been observed that concentrated aqueous solutions of polymeric N-vinyl pyrrolidones of good initial color undergo yellowing on standing for periods of time. The incorporation of as little as 0.05 wt. percent hydrazine or hydrazine derivative based on the polymer, has resulted in solutions that have been stable over a considerable period.

In the subject application, a polymeric N-vinyl pyrrolidone includes the homopolymer (N-vinyl pyrrolidone) homologues of N-vinyl pyrrolidone, copolymers of N-vinyl pyrrolidone and grafted polymers wherein the water-soluble component is a polymer of N-vinyl pyrrolidone.

It is to be understood that by the term "polymeric N-vinyl pyrrolidone," as employed in the appended claims, homopolymer (N-vinyl pyrrolidone), homologues of N-vinyl pyrrolidone, copolymers of N-vinyl pyrrolidone and grafted polymers, wherein the water-soluble component is a polymer of N-vinyl pyrrolidone, are included.

I claim:

1. A process of stabilizing a polymeric N-vinyl pyrrolidone against discoloration which comprises incorporating with said pyrrolidone a stabilizing amount of hydrazine selected from the class consisting of hydrazines having the following general formulae:

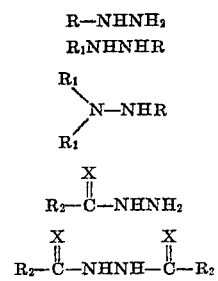

wherein R represents a member selected from the class consisting of hydrogen, alkyl, hydroxy alkyl, and ammonium lower alkanoate radicals, $R_1$ represents a member selected from the class consisting of alkyl, hydroxyalkyl, and ammonium lower alkanoate radicals, $R_2$ represents a member selected from the class consisting of $NH_2$, $ONH_4$ and alkyl radicals, and X represents a member selected from the class consisting of oxygen and sulfur.

2. The process according to claim 1 wherein the polymeric N-vinyl pyrrolidone is polymeric N-vinyl-2-pyrrolidone.

3. The process according to claim 1 wherein the polymeric N-vinyl pyrrolidone is polymeric N-vinyl-5-methyl pyrrolidone.

4. The process according to claim 1 wherein the polymeric N-vinyl pyrrolidone is a copolymer of N-vinyl pyrrolidone and acrylonitrile.

5. The process according to claim 1 wherein the polymeric N-vinyl pyrrolidone is a grafted polymer prepared from acrylonitrile and poly-N-vinyl pyrrolidone.

6. The process according to claim 1 wherein the polymeric N-vinyl pyrrolidone is polymeric N-vinyl-4-methyl pyrrolidone.

7. A color stable composition comprising polymeric N-vinyl pyrrolidone and a stabilizing amount of a reagent selected from the class consisting of hydrazine selected from the class consisting of hydrazines having the following general formulae:

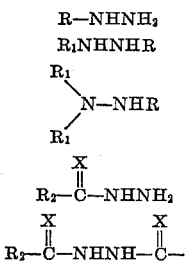

wherein R represents a member selected from the class consisting of hydrogen, alkyl, hydroxy alkyl, and ammonium lower alkanoate radicals, $R_1$ represents a member selected from the class consisting of alkyl, hydroxyalkyl, and ammonium lower alkanoate radicals, $R_2$ represents a member selected from the class consisting of $NH_2$, $ONH_4$ and alkyl radicals, and X represents a member selected from the class consisting of oxygen and sulfur.

8. A color stable composition according to claim 7 wherein the polymeric N-vinyl pyrrolidone is polymeric N-vinyl-2-pyrrolidone.

9. A color stable composition according to claim 7 wherein the polymeric N-vinyl pyrrolidone is polymeric N-vinyl-5-methyl pyrrolidone.

10. A color stable composition according to claim 7 wherein the polymeric N-vinyl pyrrolidone is a copolymer of N-vinyl-pyrrolidone and acrylonitrile.

11. A color stable composition according to claim 7 wherein the polymeric N-vinyl pyrrolidone is a grafted polymer prepared from acrylonitrile and poly-N-vinyl pyrrolidone.

12. A color stable composition according to claim 7 wherein the polymeric N-vinyl pyrrolidone is polymeric N-vinyl-4-methyl pyrrolidone.

References Cited in the file of this patent
UNITED STATES PATENTS

| | | |
|---|---|---|
| 2,265,450 | Reppe et al. | Dec. 9, 1941 |
| 2,729,690 | Oldenburg | Jan. 3, 1956 |